United States Patent [19]

Yobaccio

[11] 4,192,591

[45] Mar. 11, 1980

[54] ROTATABLE ADAPTER FOR USE IN OPTICALLY COUPLING A VIEWING DEVICE WITH A PHOTOGRAPHIC CAMERA

[75] Inventor: Edward A. Yobaccio, Westwood, Mass.

[73] Assignee: Polaroid Corporation, Cambridge, Mass.

[21] Appl. No.: 955,338

[22] Filed: Oct. 27, 1978

[51] Int. Cl.² ............................................. G03B 29/00
[52] U.S. Cl. .......................................... 354/62; 354/79
[58] Field of Search .................... 354/62, 79, 81, 293, 354/295; 350/19; 128/6

[56] References Cited

U.S. PATENT DOCUMENTS

| | | | |
|---|---|---|---|
| 3,638,643 | 2/1972 | Hotchkiss | 354/62 X |
| 3,721,170 | 3/1973 | Johnson | 354/79 |
| 3,798,665 | 3/1974 | Eloranta et al. | 354/79 |
| 3,898,678 | 8/1975 | Walworth | 354/79 |
| 3,900,021 | 8/1975 | Makepiece et al. | 128/4 |
| 3,900,858 | 8/1975 | McCann et al. | 354/79 |
| 3,918,072 | 11/1975 | Imai et al. | 354/62 |
| 3,994,288 | 11/1976 | Stumpf | 128/6 |
| 3,995,287 | 11/1976 | Storz | 354/62 |
| 4,021,825 | 5/1977 | McCann et al. | 354/79 |
| 4,120,563 | 10/1978 | Stefanou | 350/235 |

FOREIGN PATENT DOCUMENTS

974675 3/1961 Fed. Rep. of Germany ............. 354/62

OTHER PUBLICATIONS

U.S. Patent Application Ser. No. 918,779, filed 6/26/78 by W. T. Plummer, "An Adapter for Optically Coupling a Photographic Camera With a Viewing Device". Stanford; B., "Theoretical First Principles of Endoscopic Photography" in J. of Photo. Sc., vol. 3, 1955.

*Primary Examiner*—John Gonzales
*Attorney, Agent, or Firm*—Francis J. Caufield

[57] ABSTRACT

A dual optical path adapter is provided by which a camera of the type having a through-the-lens viewing system can be mechanically and optically coupled with the eyepiece of an optical viewing device such as an endoscope so that a viewable image which is formed by the endoscope can be simultaneously viewed along a first optical path of the adapter and photographed and/or viewed, via the camera, along the adapter's other optical path. The adapter is structured so that the camera can be moved between a number of positions without introducing any reversals of the object image as directly observed through the adapter's first optical path. In this manner, the camera can be focused while in one position and thereafter moved for photographing to any of its other positions which are more comfortable for the photographer.

3 Claims, 3 Drawing Figures

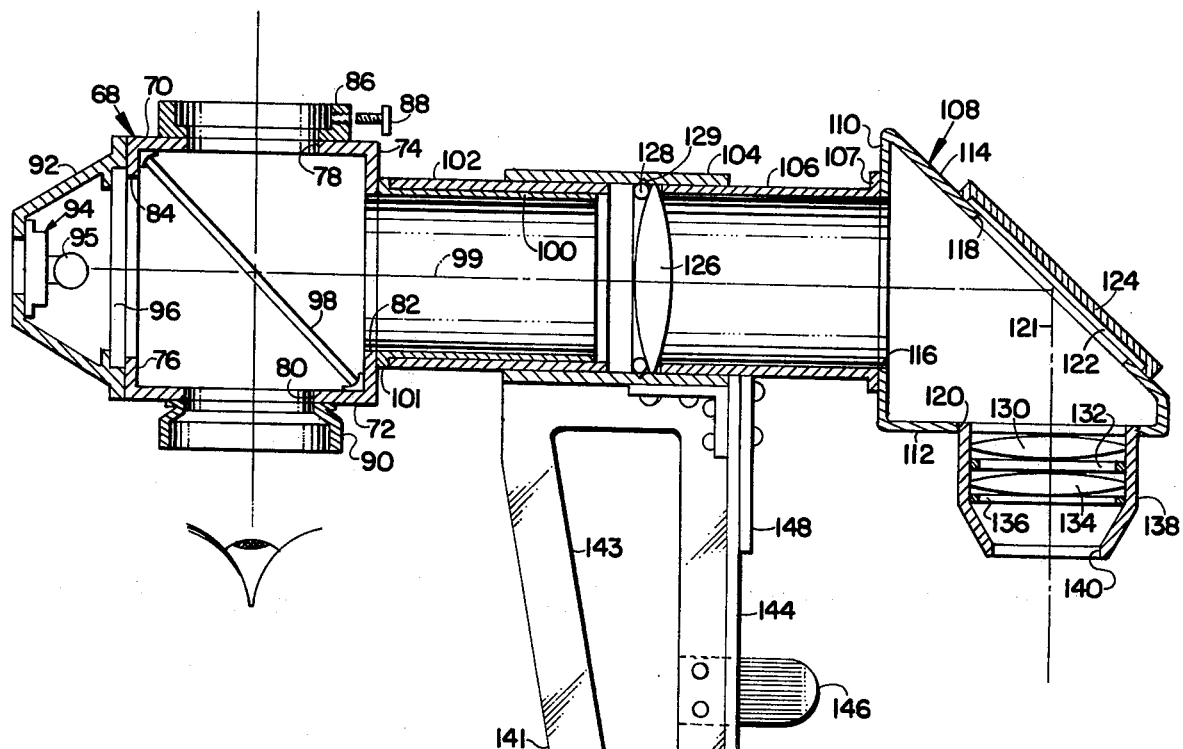
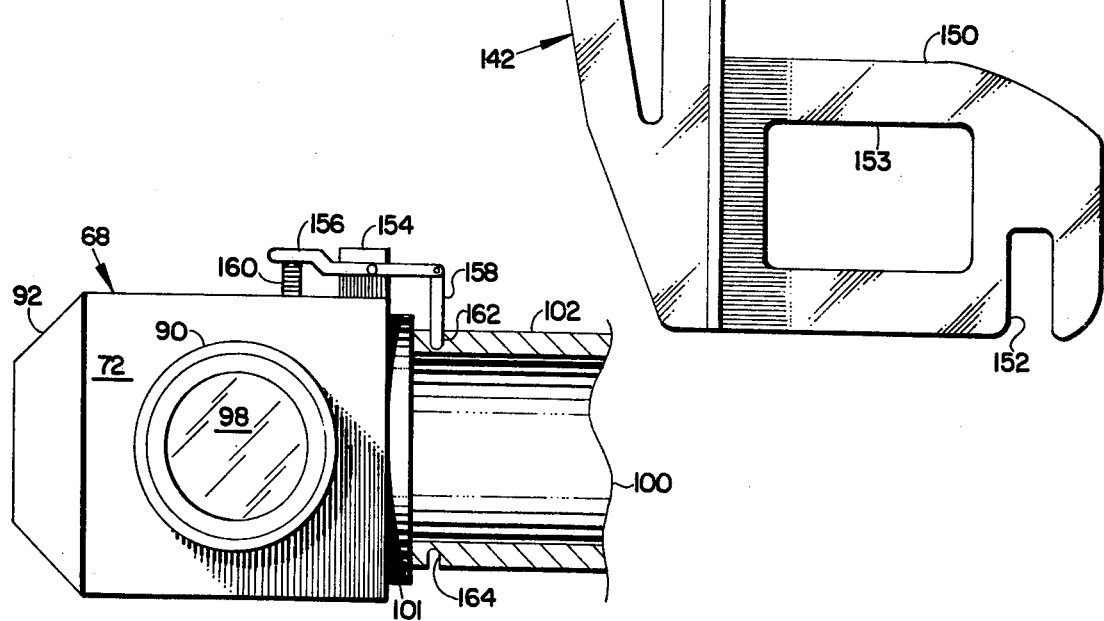
FIG. 2
FIG. 3

ROTATABLE ADAPTER FOR USE IN OPTICALLY COUPLING A VIEWING DEVICE WITH A PHOTOGRAPHIC CAMERA

CROSS-REFERENCE TO RELATED APPLICATION

The present application is related to U.S. application Ser. No. 955,378 filed concurrently herewith in the name of Lawrence K. M. Ting and entitled "Photographic Apparatus For Selectively Actuating A Pulsable Electronic Strobe" and to U.S. application Ser. No. 955,381, also filed concurrently herewith in the name of William T. Plummer and entitled "Optical Adapter Having Film Contrast Control Means".

BACKGROUND OF THE INVENTION

1. Field of the Invention

This invention generally relates to photographic apparatus but more specifically to an adapter by which a through-the-lens photographic still camera can be mechanically and optically coupled to an optical viewing device such as an endoscope to permit simultaneous viewing and photographing of the image formed by an eyepiece of the viewing device.

2. Description of the Prior Art

Endoscopes are optical viewing devices well known to the medical profession for their usefullness in diagnosing disease. With an endoscope, a physician, typically a surgical consultant, visually examines the interior of a patient's body organs for pathological processes whose presence is suspected or indicated by clinical and laboratory findings.

Once detected, a pathology is then carefully studied to determine its precise nature and extent so that the proper course of treatment can be decided upon and recommended to the patient.

For a variety of reasons, it is often advantageous for the surgical consultant to have a permanent photographic record of the endoscopic findings. Such records are useful, for example, for their educational value. Also, they can form part of the patient's permanent medical file or can be used as a basis for evaluating changes in the pathology. Additionally, endoscopic photographs serve as a powerful tool for promoting communication between the examining physician and others involved or interested in the diagnosis and as a means for informing the patient about the nature of his illness.

Although endoscopic photographs have their beneficial uses, they are somewhat difficult to obtain because the clinical form of most endoscopes generally is unsuitable for photography, because of the requirements of medically sound and safe practice, and because of the overriding concern for patient safety and comfort.

Photographic and optical principles, for instance, demand that any camera chosen for use with an endoscope must be able to be focused on the image provided by the endoscope's eyepiece, that adequate lighting be provided to assure acceptably exposed photographs, and that the examining physician, and sometimes more than one, be able to see an image of the field under examination immediately before and after a picture is taken in case of stills and continuously in the case of motion pictures. And all of this must be accomplished by apparatus which ideally shares the endoscope's single optical path.

Sound clinical procedure, on the other hand, imposes certain design constraints which makes it difficult to satisfy the photographic and optical requirements of endoscopic apparatus. One major obstacle, for example, is the clinical desirability of using only one endoscope for both the visual clinical examination and the photographic work. It is neither convenient for the examining physician nor fair to the patient to have to withdraw the clinical endoscope once a pathology has been located, insert the photographic endoscope, photograph the field of interest, withdraw the photographic endoscope and reinsert the clinical endoscope. A process like this would obviously complicate an endoscopic examination by adding additional risk and discomfort to what is inherently an uncomfortable ordeal to begin with. Also, since the endoscope must be manipulated quite a bit throughout the examination, any photographic apparatus designed for use with the clinical endoscope should not hamper the physician's freedom of movement or require extensive operations involving attachment and detachment of the photographic apparatus with the endoscope.

Consequently, apparatus used for endoscopic photography must be easy to use, i.e. manipulate, must not unduly prolong the endoscopic examination, ideally, should be mechanically and optically compatible with an existing form of clinical endoscope and, as well, must be capable of reliably reducing photographs which are acceptably exposed while containing adequate detail.

Finally, such apparatus must be absolutely safe and must, in particular, be free from any danger of causing electrical shock or creating unduly high temperatures which may come into contact with the patient.

Given the above general considerations, it is evident that the problems associated with providing apparatus for use in endoscopic photography are varied—involving both technical and human considerations. In the past, these problems have been dealt with in a variety of ways by providing either specially designed photographic systems whose use is limited to endoscopic photography or by providing adapters by which existing cameras can be used with an existing endoscope. For examples reference may be had to U.S. Pat. No. 3,368,643 issued to John E. Hotchkiss on Feb. 1, 1972 and entitled "Endoscope For Photographic Recording"; U.S. Pat. No. 3,918,072 issued to Toshihiro Imai et. al. on Nov. 4, 1975 and entitled "Single-Lens Reflex Optical System For An Endoscope"; U.S. Pat. No. 3,995,287 issued to Karl Storz on Nov. 30, 1976 and entitled "Endoscopic Camera"; U.S. Pat. No. 3,900,021 issued to Anthony Peter Walter Makepeace et. al. on Aug. 19, 1975 and entitled "Coupling For Endoscopes And Instruments Particularly Cameras"; U.S. Pat. No. 3,994,288 issued to Joseph G. Stumpf on Nov. 30, 1976 and entitled "Colposcope", and an article by Brian Stanford which appears in *The Journal of Photographic Science*, volume 3, 1955, and is entitled "Theoretical First Principles of Endoscopic Photography".

However, none of the foregoing publications appear to deal directly with the specific problem with which the present invention is concerned. In particular, the primary object of the present invention is to provide an adapter by which a still photographic camera can be mechanically and optically coupled with an optical viewing device such as an endoscope so that the viewable image formed by the viewing device's eyepiece can be simultaneously viewed and photographed or can be viewed simultaneously by two people, and by which the camera can be manipulated to a variety of positions which a photographer finds comfortable for his purposes without introducing any image reversals in the picture.

Other objects of the invention will in part be obvious and will in part appear hereinafter. The invention accordingly comprises the apparatus possessing the construction, combination of elements, and arrangement of parts which are exemplified in the following detailed disclosure.

SUMMARY OF THE INVENTION

This invention generally relates to photographic apparatus but, more specifically, to an adapter for optically and mechanically coupling a photographic camera to the proximal end of an optical viewing device such as an endoscope so that the image of an object formed by the optical viewing device can be simultaneously viewed and photographed. The camera is of the type which has a through-the-lens viewing system and the optical viewing device is of the type which has an eyepiece located at its proximal end for forming a viewable image of an object located at its distal end.

The adapter comprises a first housing section for forming a releasable, generally light-tight mechanical connection with the proximal end of the optical viewing device.

Disposed within the first housing section of the adapter are optical means for establishing a folded light path having one axis, aligned with the optical axis of the viewing device's eyepiece, along which the viewable image formed by the viewing device can be directly viewed and another axis, disposed at a predetermined angle with respect to the one axis, along which light rays which form the viewing device's viewable image are directed by the optical means.

Also provided is a second generally light-tight housing section which is structured for rotatably coupling with the first housing section and has apertured entrance and exit ends. The entrance end is aligned with the other axis of the first housing section's folded light path so that the light rays which form the viewing device's viewable image and are directed along the other axis of the first housing section's folded light path by the optical means enter the second housing section through the second housing section's entrance aperture.

Fixedly mounted in the second housing section are rotationally symmetric optical means for establishing a folded light path between the second housing section's entrance and exit apertures, for intercepting the image forming light rays which are directed along the other axis of the first housing section's folded light path to form at a predetermined spatial location within the second housing section an aerial image of the object viewed via the optical viewing device, and for facilitating focusing of the camera's objective lens on the aerial image through the second housing section's exit aperture.

Additionally, means are provided for releasably attaching the camera to the second housing section so that the camera's objective lens is aligned in a predetermined manner with the exit aperture of the second housing section whereby the viewing device's viewable image can be viewed through the exit aperture via the camera's viewing system for purposes of focusing the camera thereon and afterwards for photographing the aerial image.

The adapter is thus structured to permit the viewable image of the object formed by the optical viewing device to be directly viewed along the one axis of the first housing section's folded light path, to be viewed through the camera's viewing system along the second housing section's folded light path for purposes of focusing or alternate viewing, to be photographed along the second housing section's folded light path, and also structured for rotating the second housing section, including the camera, with respect to the first housing section so that the camera can be moved to a plurality of angular positions with respect to the first housing section from any of which positions the viewing device's viewable image of the object can be photographed after the camera has been focused. Also, the availability of the plurality of camera positions provides the photographer with the option of placing the camera in a comfortable position for his purposes without introducing any reversals in the image as observed directly along the one axis of the first housing section's folded light path.

DESCRIPTION OF THE DRAWINGS

The novel features that are considered characteristic of the invention are set forth with particularity in the appended claims. The invention itself, however, both as to its organization and method of operation together with other objects and advantages thereof will best be understood from the following description of the illustrated embodiment when read in connection with the accompanying drawings wherein like numbers have been employed in the different figures to denote the same parts and wherein:

FIG. 2 is an enlarged top view of the adapter of the invention partially sectioned along line 2—2 of FIG. 1; and FIG. 3 is a rear elevational view of a part of the invention shown in FIG. 1 with parts shown in section.

DESCRIPTION OF THE PREFERRED EMBODIMENT

Figure 1:
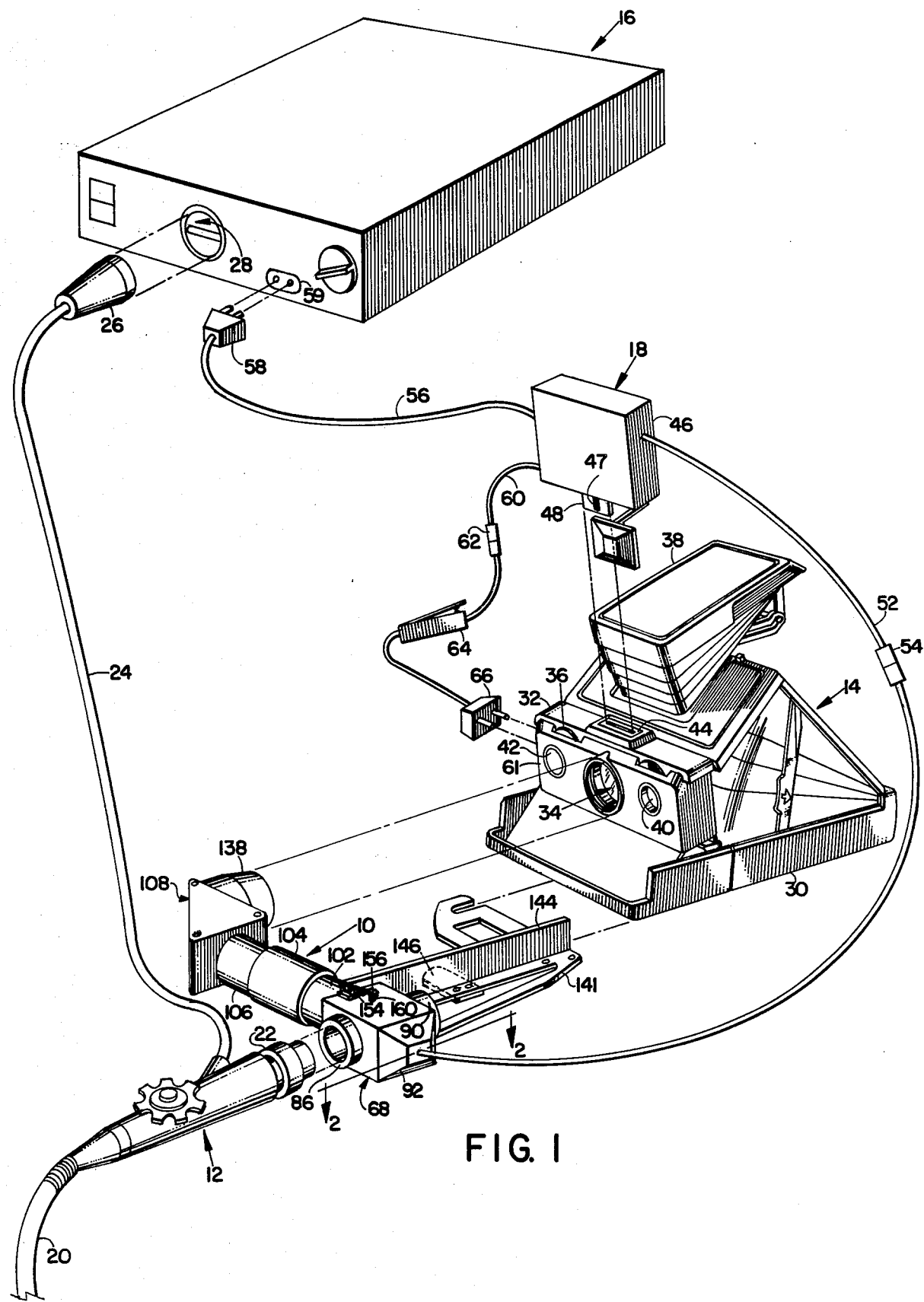
FIG. 1 is a diagrammatic perspective view of the preferred embodiment of the adapter of the invention shown in combination with a photographic camera, an endoscope, an artificial light source, and an electronic control device.

Referring now to FIG. 1, there is shown at 10 the preferred embodiment of the adapter of the present invention shown in combination with a clinical endoscope 12, an automatic camera 14, an electronic artificial light source 16, and an electronic control device 18. The adapter 10, the photographic camera 14, the electronic light source 16, and the electronic control device 18 collectively form a photographic system for practicing endoscopic photography in a manner which will be more readily apparent as this description proceeds. However, only as much detail as is necessary to understand the structure and operation of the adapter 10 will be given when referring to the other components which make up the photographic system.

The clinical endoscope 12 constitutes an optical viewing device of the type which has a field of view that is larger than the diameter through which the field can be viewed and which is located several diameters away from the aperture through which the field is viewed. As best shown in FIG. 1, the endoscope 12 comprises an elongated flexible fiber optic bundle 20 which has an objective lens system (not shown) located at its distal end for forming on the distal end of the fiber optic bundle 20 a real image of the object or field being explored by an examining physician. The image formed on the distal end of the fiber optic bundle 20 is then transferred in a well-known manner via the fiber optic bundle 20 to the proximal end of the endoscope 12 where it is then reimaged by an eyepiece 22 which forms a collimated-to-nearly-collimated image of the object which is located at the distal end of the endoscope 12.

The object under examination is illuminated via another fiber optic bundle 24 which receives light at its proximal end from a lamp assembly generally designated at 28 and located in the light source 16. The lamp assembly 28 can be operated in a well-known manner in a steady state mode to provide a continuous source of illumination which is optically coupled in a well-known manner with the fiber optic bundle 24 via an adapter 26. The adapter 26 may include a condenser lens system for providing even illumination of the field under investigation and may also include a heat absorbing filter which cools the light thereby keeping the distal end of the endoscope 12 at a safe operating temperature so as not to endanger a patient.

As is well known, the physician conducting the endoscopic examination views the interior of the patient's body organ that is suspected of having a pathology through the eyepiece 22 of the endoscope 12 until he locates the particular pathology. The purpose of the adapter 10 of the present invention is to optically and mechanically couple the photographic camera 14 with the eyepiece 22 of the endoscope 12 so that the image of the field or object formed by the endoscope 12 can be simultaneously viewed and photographed.

The camera 14 may be any of a number of well-known types but, as illustrated, represents Polaroid Corporation's SX-70 Land Camera which is fully automatic having an automatic exposure control system and is adapted to accept the well-known self-processable SX-70 color film which is processed by the camera in a well-known manner immediately after it has been exposed.

The camera 14 includes a base housing member 30 which is adapted in a well-known manner to releasably hold film cassettes (not shown) of the aforementioned type of film. Such film cassettes as is also well-known include a stacked array of self-processable film units underneath which is positioned a flat, thin battery which is used to supply power to operate the various electrical components of the camera 14. An example of such film cassettes is described in considerable detail in U.S. Pat. No. 3,872,487 issued to Nicholas Gold on Mar. 18, 1975 and entitled "Photographic Film Assemblage and Apparatus" and of such film units in, for example, U.S. Pat. Nos. 3,415,644; 3,594,165; and 3,761,268.

Camera 14 also includes a forward housing section 32 in which is disposed an objective taking lens 34 which can be focused in a well-known manner via a focus control wheel 36.

Additionally included in the camera 14 is a through-the-lens viewing system by which an object to be photographed can be observed through the objective taking lens 34 via a reflex arrangement (not shown) and a viewing device 38 located on the uppermost part of the camera 14. In practice, a photographer, while looking through the viewing device 38, aims the camera 14 at the object he wishes to photograph and rotates the focusing wheel 36 to adjust the focus of the objective lens 34 until the image of the object is sharp. The focusing range over which this may be accomplished covers distances as near as 10.4 inches and as far as infinity.

Once the camera 14 has been focused, a photographic cycle is initiated by depressing a camera start button 42 which is also located in the forward housing section 32 and which couples the film cassette's battery with the various electrical components of the camera 14. During the photographic cycle film exposure commences after a predetermined delay upon the opening of an electromechanical shutter (not shown) and thereafter is automatically terminated after a light sensing circuit, including a light sensing element 40, measures scene brightness and commands the shutter to close upon detection of a predetermined exposure value. For a more detailed description of the camera 14, reference may be had, for example, to U.S. Pat. No. 3,714,879 issued to Edwin H. Land et al. on Feb. 6, 1973 and entitled "Reflex Camera".

The electronic control device 18 electrically mates with the adapter 10 via a cable and connector arrangement, 52 and 54 respectively; with the light source 16 via another cable 56 and a plug 58 which inserts into a complementary configured socket 59 in the light source 16; and with the camera 14 via a cable 60, a connector 62, a foot switch 64, and a plug 66 which inserts into a complementary configured socket located, but not shown, in a left side wall 61 of the camera's forward housing section 32, and via a blade 48 which depends downwardly from a housing 46 and inserts into a well-known socket assembly 44 located in the top wall of the camera's forward housing section 32. As is more fully described in U.S. Pat. No. 4,064,519, issued to Richard C. Kee on Dec. 20, 1977, and entitled "Regulated Strobe For Camera With Sixth Flash Inhibit", the electronic device 18 can derive power from the camera's battery by selectively mating a conducting strip 47 located on the blade 48 with a corresponding terminal (not shown) located in the flash socket 44 and by inserting the plug 66 into its corresponding socket previously mentioned. In this manner, the electronic device 18 can derive power from the camera's battery and operates in a manner as is more fully described in U.S. patent application Ser. No. 955,378, filed concurrently herewith on behalf of Lawrence K. M. Ting and entitled "Photographic Apparatus For Selectively Actuating A Pulsable Electronic Strobe" to actuate the light source 16 in a predetermined manner during a photographic cycle of the camera 14 to assure that adequate lighting is provided while a picture is being taken.

Referring now to FIGS. 1 and 2, the structure and operation of the various components which make up the adapter 10 of the invention will now be described. In those figures, it can be seen that the adapter 10 comprises a generally cube-shaped housing section 68 which includes (see FIG. 2) a forward wall 70, a rear wall 72 spaced from the forward wall 70, and a right side wall 74 and a left side wall 76 which interconnect the forward wall 70 and the rear wall 72. Located in each of the walls, 70, 72, 74 and 76, of the housing section 68 are apertures 78, 80, 82 and 84 respectively. The apertures, 78 through 84, function to permit light to enter and leave the housing section 68.

Surrounding the forward wall's aperture 78 and aligned therewith is an apertured collar 86 that is selectively shaped to receive the eyepiece 22 of the endoscope 12. The eyepiece 22 is fixedly retained with the collar 86 via a thumb screw 88. When the eyepiece 22 of the endoscope 12 is inserted in the collar 86 and the thumb screw 88 tightened, its optical axis is automatically aligned with the centerline of the forward wall's aperture 78. In this manner, means are provided for forming a releasable, generally light-tight mechanical connection with the eyepiece 22 which is located at the proximal end of the endoscope 12.

The rear wall's aperture 80 is formed in the rear wall 72 so that its center is also aligned along the optical axis of the endoscope's eyepiece 22. Surrounding the rear wall's aperture 80 and concentric therewith is an apertured eyecup 90 through which the collimated image formed by the endoscope's eyepiece 22 can be viewed.

Overlying the left side wall's aperture 84 is a diffuser 96 behind which is located a lamp assembly 94, including a lamp 95, which is retained in a well-known manner to the left side wall 76 via a lamp housing 92. In general, the purpose of the diffuser 96 and the lamp 95, which also derives its power from the camera's battery via the electronic device 18, is to provide means by which the contrast of the film with which the camera 14 is used can be improved so that more of the detail of the field being photographed can be captured than would otherwise be possible absent the diffuser 96 and the lamp 95. For a more detailed description regarding how this is accomplished, reference may be had to U.S. patent application Ser. No. 955,381 filed concurrently herewith in the name of William T. Plummer and entitled "Optical Adapter Having Film Contrast Control Means".

Provided in the housing 68 is a beamsplitter 98 which diagonally extends between the forward wall 70 and the rear wall 72 at an angle of 45° to the optical axis of the endoscope's eyepiece 22. In this manner, optical means are provided which are disposed within the housing section 68 for establishing a folded light path which has one axis, aligned with the optical axis of the endoscope's eyepiece 22, along which the collimated or viewable image formed by the endoscope 12 can be directly viewed. The other axis or branch of the folded light path thus provided and designated at 99 is disposed at 90° with respect to the first axis. As is readily apparent, light rays which form the endoscope's viewable image are directed along the second branch 99 of the folded light path by the beamsplitter 98 where they pass through the right side wall's aperture 82.

The adapter 10 also includes a generally prismatic shaped housing section 108 that is triangular in cross-section and includes a wall 110 having an aperture 116 therein, a wall 112 at right angles to the wall 110 and having an aperture 120 therein, and a wall 114 which has an aperture 118 therein and is arranged at an angle of 45° with respect to both the walls 110 and 112.

The housing 108 is rotatably connected with the housing 68 via a tubular arrangement which comprises an elongated cylindrical tube section 100 that is rigidly fastened with the right side wall 74 of the housing section 68 via a flange 101 and is concentric with the right side wall's aperture 82, a cylindrical sleeve 102 that is structured for slidable engagement with the tubular section 100, another cylindrical tubular section 106 that is fixedly attached to the forward wall 110 of the housing section 108 via a flange 107 and which is concentric with the aperture 116 of the forward wall 110, and a collar 104 structured to slide over the outside surfaces of the sleeve 102 and the tubular section 106 to fixedly couple one to the other.

In the foregoing manner, the housing section 108 is rotatably coupled with the housing section 68 so that the center of the aperture 116 is colinear with the folded axis of the folded light path formed by the beamsplitter 98 in the first housing section 68 so that the light rays which form the viewable image provided by the endoscope's eyepiece 22 and are directed along the folded axis 99 of the folded light path of the housing section 68 towards the aperture 116.

A first relay lens 126 is provided within the interconnecting tubular arrangement which rotatably couples the housing section 68 to the housing section 108 for the purpose of intercepting light rays which are reflected from the beamsplitter 98 as they travel along the folded optical axis 99 of the housing section 68. The relay lens 126 is structured to form in a predetermined spatial location within the adapter 10 an aerial image of the object being viewed by the endoscope's optical system. The relay lens 126 has an outside diameter which is substantially the same as the inside diameter of the collar 104 and its rear peripheral surfaces is retained against the annular edge of the cylindrical tubular section 106 by a lens retaining ring 128 which snaps into a groove 129 provided on the interior surface of the collar 104 for this purpose.

Overlying the aperture 118 of the diagonal wall 114 of the housing section 108 is a mirror 122 that is retained in overlying relationship with respect to the aperture 118 by a suitable mirror retainer such as that designated at 124. The mirror 122 operates in a well-known manner to intercept light rays which emerge from the relay lens 126 and redirect them along a second folded light path of the adapter 10 whose folded branch or axis designated at 121, as can best be seen from FIG. 2, is parallel with the optical axis of the endoscope's eyepiece 22.

A lens housing 138 threadably mounts within the aperture 120 of the rear wall 112 of the housing section 108 such that the center of an exit aperture 140 thereof is colinear with the folded branch 121 of the adapter's second folded optical path provided by the mirror 122. Mounted within the lens housing 138 is a second relay lens (134 and 130 taken together) that are retained therein by a pair of retainers 136 and 132 respectively and is structured in a well-known manner to allow the camera's objective taking lens 34 to be focused on the aerial image formed by the first relay lens 126.

Lens 126 and lenses 130 and 134 also are placed to act jointly in a well-known manner to form an image of the exit pupil of the endoscope's eyepiece 22 onto the entrance pupil of the camera's objective taking lens 34 as seen through the second relay lens 134. Structured in this manner, substantially all of the rays from the aerial image pass through the entrance pupil of the camera's objective taking lens 34.

It will be readily apparent to those skilled in the optical arts how to structure the various optical elements of the adapter 10 to provide the various functions as herein described.

Structured in the foregoing manner, the relay lens 126, the mirror 122, the field lens 130, and the relay lens 134 collectively define a rotationally symmetric optical system which is fixedly associated with the housing section 108 to establish a folded light path between its entrance aperture 116 and its exit aperture 120, to intercept the image forming light rays which are directed along the folded branch 99 of the folded optical path of the housing section 68 and form in a predetermined spatial location within the adapter 10 an aerial image of the object viewed via the endoscope's eyepiece 22 and for facilitating focusing of the camera's objective taking lens 34 on the aerial image by way of the aperture 140 located in the lens housing 138.

Means for releasably attaching the camera 14 to the adapter 10 are provided in the form of a bracket assembly designated generally at 142. The bracket assembly 142 comprises an elongated, somewhat triangular shaped, frame member 141 having one end fixedly mounted in a well-known manner to the collar 104 and portions of the tubular section 106. The frame member 141 has a hollowed out central triangular section 143 by which its weight is reduced.

As best seen in FIG. 1, the frame member 141 along one edge thereof has an upwardly extending flange 144, a locating stop 148 (FIG. 2) which is located near its fixed end and attached to the flange 144, a centrally located camera support tab 146, and a camera supporting platform 150 which is located at its free end and extends outwardly in a direction generally perpendicular to the elongated dimension of the frame member 141. The platform 150 also has an apertured central portion 153 to reduce its weight and, as well, includes an elongated slot 152 for slidably receiving a thumb screw which fits into a tripod mount located in the base 30 of the camera 14 (not shown).

As seen in FIG. 1, the camera 14 is slid alongside the locating flange 144 with the right side of its base 30 such that it is guided by the flange 144 until the right side of the forward wall of its front housing section 32 butts up against the forward surface of the stop 148. In this manner, the stop 148 and the flange 144 cooperate to align the objective taking lens 34 of the camera 14 in a predetermined manner with the exit aperture 140 of the lens housing 138. Once located, the thumb screw, which extends through the slot 152 into the camera's tripod mount, is tightened to secure the camera 14 in place.

In the foregoing manner, means have been provided for releasably attaching the camera 14 to the adapter 10 so that the camera's objective lens 34 is aligned with the aperture 140 so that the viewable image formed by the endoscope's eyepiece 22 can be viewed through the aperture 140 via the camera's viewing system for purposes of focusing the camera 14 thereon and afterwards for photographing the aerial image formed by the optical system of the adapter 10 as previously described.

Referring now to FIG. 3, it can be seen that the sleeve 102 is provided with a pair of holes 162 and 164 respectively which are spaced apart by 180°. Also, mounted atop the housing section 68 is a support bracket 154 having a lever 156 pivotally mounted thereto. The forward end of the lever 156 has a pin 158 attached to it while its rear end has a compression spring 160 which is configured to bias the pin 158 downwardly toward the holes, 162 and 164, located in the collar 102. In this manner the portion of the adapter 10 which is fixedly attached to the endoscope's eyepiece 22 (i.e. housing 68 and tubular section 100) and the rotatable portion of the adapter 10 (i.e. the housing 108, the sleeve 102, the collar 104, the tubular section 106, and the bracket 142) include complementary configured portions for releasably locking one to the other so that when the rotating portion is placed in either of its angular positions with respect to the fixed portion, the sleeve 102 cannot be displaced away from the housing section 68 along the axis 99 thereby keeping the combined length of the optical path of the adapter 10 fixed regardless of the angular position of the rotatable portion of the adapter 10.

In the foregoing manner, the adapter 10 is structured to permit the viewable image of the object formed by the endoscope 12 to be directly viewed along the optical axis of the endoscope's eyepiece 22 via the exit aperture 80 of the housing section 68 or to be viewed through the camera's viewing system via the exit aperture 140 of the lens housing 138 for purposes of focusing or alternate viewing, to be photographed along the folded optical path of the housing section 108, and also structured for rotating the housing section 108, including the camera 14, with respect to the housing section 68 so that the camera 14 can be moved to a plurality of angular positions with respect to the housing section 68. After the camera is focused, the viewable image formed by the endoscope's eyepiece 22 can be photographed from any of the camera's angular positions. The availability of the plurality of angular positions of the camera thus provides the photographer with the option of placing the camera in a comfortable position for his purposes without introducing any reversals in the image as observed directly through the exit aperture 80 of the housing section 68.

Certain changes may be made in the above-described embodiment without departing from the scope of the invention and those skilled in the art may make still other changes according to the teachings of the present invention. Therefore, it is intended that all matter contained in the above description or shown in the accompanying drawings shall be interpreted as illustrative and not in a limiting sense.

What is claimed is:

1. An adapter for optically and mechanically coupling a photographic camera to the proximal end of an optical viewing device such as an endoscope so that the image of an object formed by the optical viewing device can be simultaneously viewed and photographed, the camera being of the type which has a through-the-lens viewing system and the optical viewing device being of the type which has an eyepiece located at its proximal end for forming a viewable image of the object, said adapter comprising:

a first housing section for forming a releasable generally light-tight mechanical connection with the proximal end of the optical viewing device;

optical means disposed within said first housing section for establishing a folded light path having one axis, aligned with the optical axis of the viewing device's eyepiece, along which the viewable image formed by the viewing device can be directly viewed and another axis, disposed at a predetermined angle with respect to said one axis, along which light rays which form said viewing device's viewable image are directed by said optical means;

a second generally light-tight housing section structured for rotatably coupling with said first housing section and having apertured entrance and exit ends of which said entrance end is aligned with said other axis of said first housing section's folded light path so that the light rays which form the viewing device's viewable image and are directed along said other axis of said first housing section's folded light path by said optical means enter said second housing section through said second housing section's entrance aperture;

rotationally symmetric optical means fixedly mounted in said second housing section for establishing a folded light path between said second housing section's entrance and exit apertures, for intercepting the image forming light rays which are directed along said other axis of said first housing section's folded light path to form at a predetermined spatial location within said second housing an aerial image of the object viewed via the optical viewing device and for facilitating focusing of the camera's objective lens on said aerial image through said second housing section's exit aperture; and means for releasably attaching the camera to said second housing section so that the camera's objective lens is aligned in a predetermined manner with said exit aperture of said second housing section whereby the viewing device's viewable image can be viewed through said exit aperture via the camera's viewing system for purposes of focusing the camera thereon and afterwards for photographing said aerial image, said adapter thus being structured to permit the viewable image of the object formed by the optical viewing device to be directly viewed along said one axis of said first housing section's folded light path, to be viewed through the camera's viewing system along said second housing section's folded light path for purposes of focusing or alternate viewing, to be photographed along said second housing section's folded light path, and also structured for rotating said second housing section, including the camera, with respect to said first housing section so that the camera can be moved to a plurality of angular positions with respect to said first housing section from any of which positions the viewing device's viewable image of the object can be photographed after the camera has been focused, the availability of said plurality of camera positions thus providing the photographer with the option of placing the camera in a comfortable position for his purposes without introducing any reversals in the image as observed directly along said one axis of said first housing section's folded light path.

2. The adapter of claim 1 wherein said first and second housing sections both include complementary configured portions for releasably locking said second housing section in any of its said angular positions with respect to said first housing section such that the combined length of said folded optical paths of both of said housing sections is fixed regardless of the angular position to which said second housing section is rotated.

3. The adapter of claims 1 or 2 wherein both said housing sections and their respective optical means are configured and arranged with respect to one another so that said second housing section's folded optical path has one of its axes collinear with said first housing section's other axis and about which said second housing section rotates and another axis along which said exit aperture of said second housing section is arranged and which rotates in a plane that is parallel with said one axis of said first housing section.

* * * * *